Figure 1:
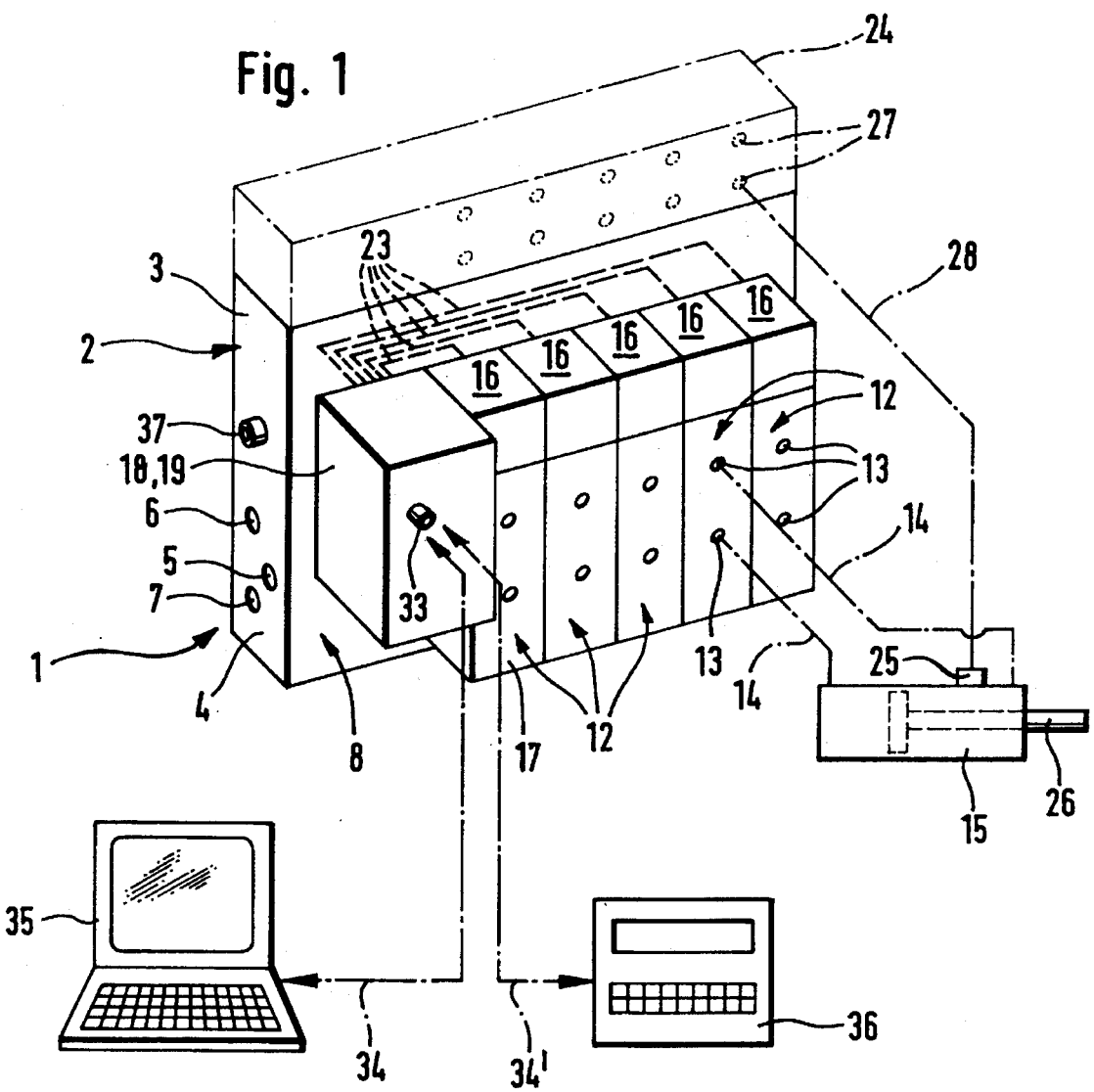

United States Patent [19]

Hohner

[11] Patent Number: 5,458,048
[45] Date of Patent: Oct. 17, 1995

[54] ELECTRO-PNEUMATIC CONTROL DEVICE

[75] Inventor: Heinz Hohner, Esslingen, Germany

[73] Assignee: Festo KG, Esskingen, Germany

[21] Appl. No.: 211,784

[22] PCT Filed: Aug. 19, 1992

[86] PCT No.: PCT/DE92/00703

§ 371 Date: Apr. 18, 1994

§ 102(e) Date: Apr. 18, 1994

[87] PCT Pub. No.: WO94/04831

PCT Pub. Date: Mar. 3, 1994

[51] Int. Cl.[6] .............................. F15B 13/044; E03B 3/00
[52] U.S. Cl. .............................. 91/459; 91/521; 137/884; 137/624.2
[58] Field of Search .............................. 91/459, 508, 521, 91/DIG. 1; 137/884, 624.2

[56] References Cited

U.S. PATENT DOCUMENTS 4,553,734  11/1985  Oka et al. .............................. 91/459 X
4,644,848  2/1987  McKendrick .
5,018,431  5/1991  Gray et al. .............................. 91/459 X
5,182,908  2/1993  Devier et al. .............................. 91/518 X
5,222,524  6/1993  Sekler et al. .............................. 137/884
5,301,717  4/1994  Goedecke .............................. 137/884

FOREIGN PATENT DOCUMENTS 0333057  9/1989  European Pat. Off. .
3800399  9/1988  Germany .
3042205  7/1990  Germany .
675752  11/1990  Switzerland .

Primary Examiner—F. Daniel Lopez
Assistant Examiner—Hoang Nguyen
Attorney, Agent, or Firm—Hoffmann & Baron

[57] ABSTRACT

This is an electro-pneumatic control device which includes a valve station (2) designed similar to a subassembly. The valve station (2) is provided with a fluid conductor (4) which is equipped with a plurality of valves (12) and a central electronic control unit which is formed by a control block (19). The control block (19) is a direct component of the valve station (2), so that a external central control unit is eliminated.

15 Claims, 2 Drawing Sheets

5,458,048

ELECTRO-PNEUMATIC CONTROL DEVICE

DESCRIPTION

The invention relates to an electro-pneumatic control device with a valve station designed as a subassembly, containing a fluid distributor equipped with a plurality of valves, and with a central electronic control unit which supplies the electric actuating signals for the valve drives.

Control devices of this type are contained in the delivery program of applicant. Thus, these subassembly type valve stations are designated as "valve island" or "installation island" and comprise a plate like fluid distributor which is equipped with multiway valves. The actuation of these multiway valves is performed by means of electrically actuable valve drives which are regularly formed by electromagnets or magnet valves. Since the valve station is designed as a unitary manipulatable unit, it can be advantageously mounted in the immediate proximity of the machine to be controlled, so that short pneumatic feed paths are provided between the multiway valves and the devices to be driven, for example, operating cylinders. A central electronic control unit supplies the actuation signals for the valve drives, whereby the control unit is mounted in a control panel which is placed at a location advantageous for the operator. Corresponding cables are provided for the signal transmission which are installed between the central control unit and the given valve station. A similar device is also described in DE 30 42 205 C2.

The installation of the central electronic control unit is hitherto very expensive and required extensive wiring in a control panel. Above all, if only smaller automated tasks have to be carried out, the required installation expense is disproportionally high. Therefore, if only smaller machine units or individual machine stations have to be controlled, one still uses conventional devices without valve stations.

It is an object of subject invention to provide a control unit of the aforementioned type which enables an automation of smaller machine installations or machine stations with a relatively low expense.

For solving the object it is provided that the central control unit is designed as a control block which constitutes a direct component of the of the subassembly type of valve station.

In this manner a central electronic control unit which stands separately is eliminated which would be expensive to connect with the available valve stations. Rather, the central electronic control unit is concentrated in a compact control block which constitutes a component fixedly connected with the valve station and therefor a subassembly part of the valve station. Hence, the installation location of the valve station is also the installation location of the central control unit. Naturally, this reduces the required wirings considerably. The control block may be integrated as a unitary piece into the valve stations, but may also be designed in such a matter that it can be removed from the valve station if desired. The latter enables a rapid exchange in case of operational breakdowns. Now, one can associate a compact valve station with smaller installations or machine stations in an inexpensive manner which includes the central electronic control unit.

Advantageous further embodiments of the invention are stated in the subclaims.

The control block of the valve station can contain an electronic fixed program which is coordinated with the number of the equipped valves and the control tasks to be solved. Such a solution is particularly economical. However, a more variable use may be obtained with a programable control block which enables an adaptation of the control program at the site for the control tasks to be solved.

In order to enable the programming an interface may be provided on the control block for connecting a personal computer. The same assures a simple programming, an operating without a problem in the on-line-operation or a documetation of program lists or the like.

Advantageously the control block also has an interface for connecting an indicator and/or operating device which advantageously is identical with that of the computer. As soon as the control device has been set up, the computer may be replaced by the indicator and/or operating device, through which the operation of the valve station is carried out.

It is possible to interconnect a plurality of the inventive valve stations with a field bus. In this case, the control block of one of those valve stations can form a so-called master-control unit which controls the remaining control blocks. However, at any time, the dependent control blocks may be operated self-sufficiently, in particular for servicing, changing over or maintenance purposes.

It is also possible to connect control blockless valve stations to the valve station which is equipped with the control block, which again is advantageously carried out through a fieldbus, whereby one of the control blockless valve stations is equipped with a fieldbus communication unit As in the aforementioned case a so-called master is present which controls dependent stations, so-called slaves. In a compact construction of a control device automation tasks can be economically solved.

Figure 2:
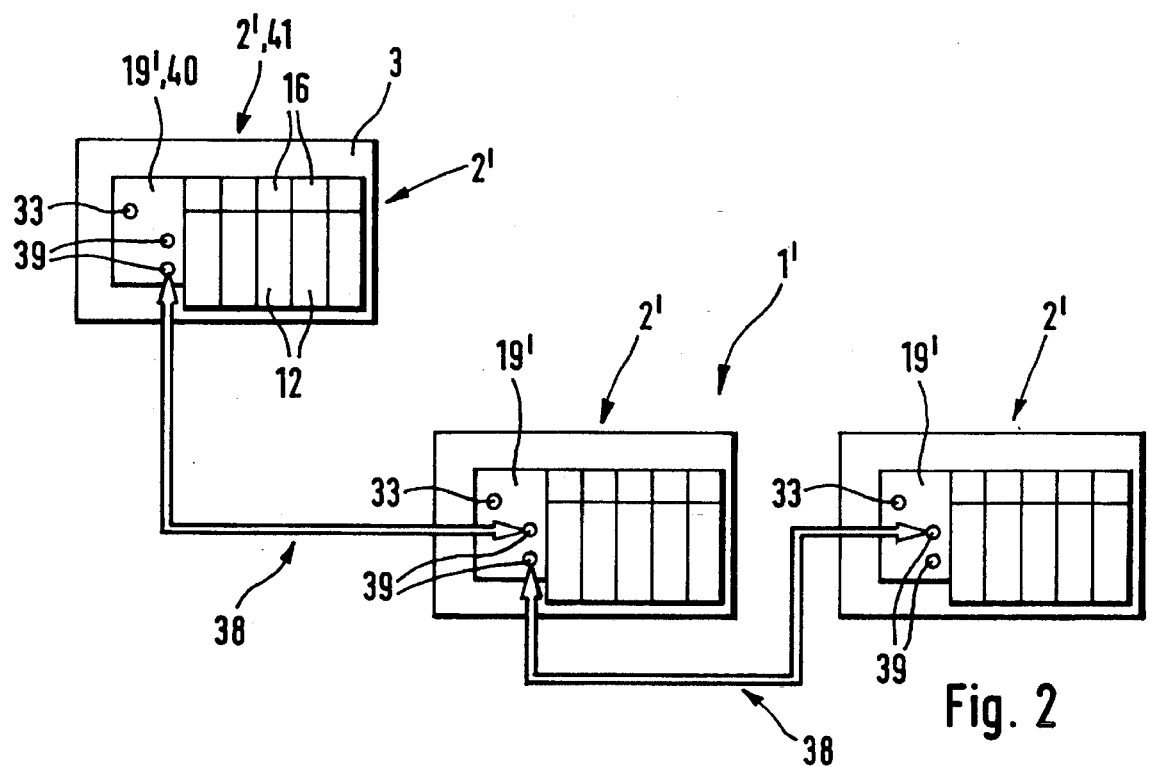
Figure 3:
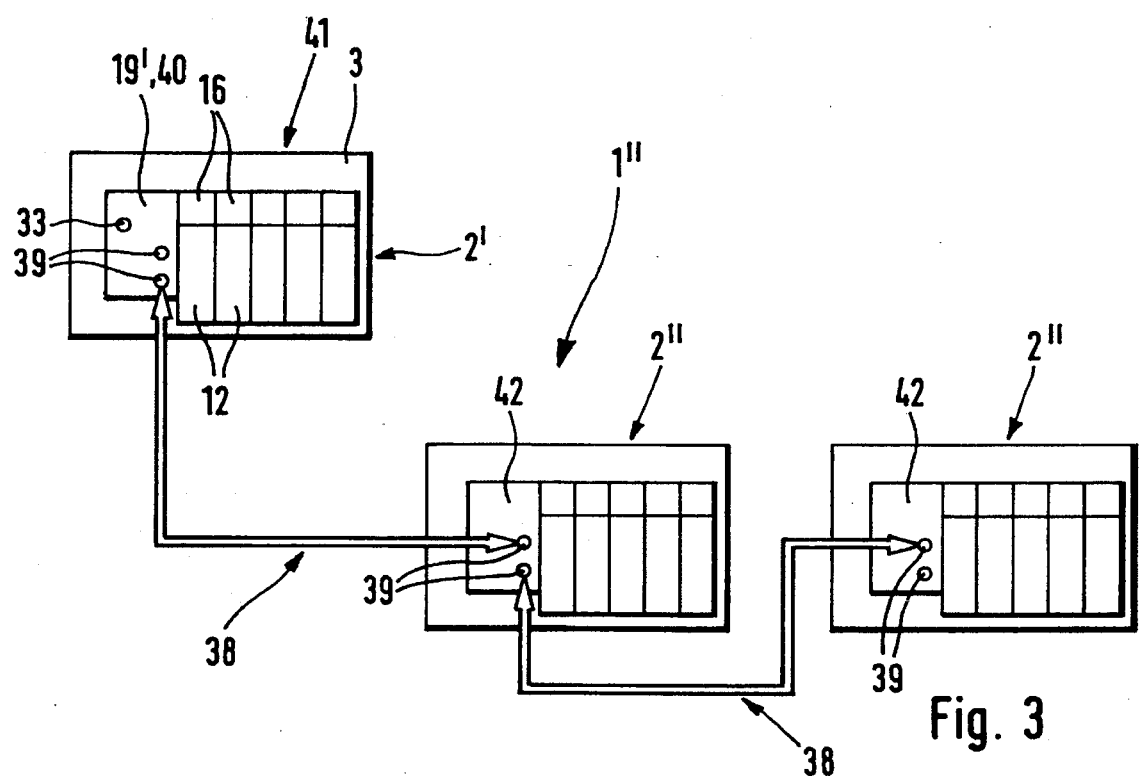

In the following the invention will be explained in detail in conjunction with the appended drawing which shows:

FIG.1 a first type of structure of the control device in a perspective schematic view, whereby, among others, a valve station is shown equipped with a control block, FIG.2 a control device with a plurality of interconnected valve stations, each containing a control block, of which one has the function as a main or master function, and FIG.3 a further embodiment of the control device, whereby a plurality of control blockless valve stations are connected to a valve station equipped with a control block.

The electro-pneumatic control device 1 illustrated in FIG. 1, has a subassembly like valve station 2. The latter is provided with a base plate 3 which, among others, forms a fluid distributor 4 for a pneumatic medium. One can see a central feeding conduit 5 extending within the fluid distributor 4 as well as, by way of example, two central venting conduits 6, 7. The supply and/or discharge of the pressure medium. The mentioned conduits 5, 6, 7 discharge through branch conduits, which are not illustrated in detail on a face 8 of the fluid distributor 4, wherein the latter is equipped with a plurality of valves 12 in form of multiway valves. These valves 12 communicate with the feeding conduit 5 and the venting conduits 6, 7 through the mentioned branch conduits. Connecting means 13 on valves 12 permit the connecting of pressure medium lines 14 which feed to pressure medium actuable operating devices 15. For clarity sake only one operating device 15 is representatively illustrated in FIG. 1, which is formed by an operating cylinder. By a suitable switching of valves 12, the presure medium supply of the operating device 15 is controlled, so that the same can be actuated in the desired manner.

In order to switch the valves in the desired manner, one each electrically actuable valve drive 16 is associated therewith. The latter is fixedly connected with the associated 12, for example, and is particularly mounted at least on a front face of its valve housing 17. In this manner, the valve drives 16 are fixedly connected with base plate 3. Naturally, it is also possible to mount the valve drives 16 alternatively or additionally, in particular detachably on the base plate 3, by means of suitable mounting means.

The electric actuating signals which are required for actuating the valve drives 16 are supplied by a central electronic control unit 18 which preferably is designed as a control block 19 and forms a subassembly part of valve station 2. The control block 19 is a direct component or subassembly component of valve station 2, and as such, is fixedly connected therewith. When handling the valve station 2, for example, to install the same at a suitable site, the control block 19 is automatically included into the handling. It is not required to install expensive signal lines between a remote installed central control unit and valve station 2, since the central control unit 18 practically forms a fixed component of valve station 2.

It would principally be possible to integrate the control block 19 directly into the valve station 2 and, in particular, into base plate 3. However, the illustrated exemplified is advantageous, wherein the control block 19 is detachably mounted on the base plate 3, so that it can be removed without any problem if so desired, for example, for correcting operational break-downs.

It is also advantageous if the control block 19 is mounted on the same face 8 as valves 12. By way of example, the valves 12 are mounted in series like batteries, whereby their longitudinal axes extend at a right angle with respect to the sequential direction, and whereby the control block 19 is located in the area of a front face of the row of valves.

The valve drives 16 are actuated electrically through actuating signals, which are supplied by the control block 19. In view of the compact inclusion into a single valve station, very short signal paths are generated. Since the local association between the valve drives 16 and the control block 19 is unchangeable, the electrical conductors 23 which serve for the signal transmission and which are schematically indicated by dash lines, can be integrated without any problems into the base plate 3 in the same manner as the fluid conduits. Thereby, the electric conductors 23 may be a component of a conductor plate, but may also be individual wires which are integrated into one or a plurality of cables. Advantageously, a suitable hollow space will be provided in the base plate 3, wherein the electrical conductors 23 may be installed. It would be possible to perform the connection of the electric conductors 23 to the control block 19 and the valve drives 16 by means of plug-in devices. The latter may be so designed that when equipping the base plate 3 with the valve drives 16 and/or the control block 19, the required electric connections are automatically made.

A dash-dotted line is illustrated in FIG. 1, indicating a plate expansion 24 which may be provided, if the valve station 2 should be cooperate with monitoring devices 25. By way of example, such a monitoring device 25 is illustrated as a sensor which is provided on the operating device 15 and which causes a signal in dependency from the position of its output part 26. This signal is then transmitted to the control block 19 and/or valve drive 16 over electric conductors, not shown in detail, of valve station 2. Thereby, the control block 19 can consider the operating condition of the connected operating devices 15 when controlling valve drives 16. By way of example, a plurality of connecting means 27 are indicated on the plate expansion 24 which enable the connecting of signal transmission lines 28, which come from the monitoring devices 25.

In the operating condition a control program is contained in control block 19 which contains the different parameters to be considered for actuating the valve drives 16. It may be a fixed predetermined program made by the manufacturer which cannot be changed by the user. This solution is advantageous for controlling very small installations. However, more variable is the variant selected in the exemplified embodiments, wherein the control block 19 is programable and is equipped with a variable programable control program. The programming is performed on site, in particular after the valve station has been fixedly installed on the operating site and that the required electric and fluidic connections are made. At least one interface 33 is provided on control block 19 on which a computer 35 may be connected, at least temporarily, through a connecting cable 34 which is indicated by a dash-dotted line. The latter may be a commercially available personal computer. The software of the control block 19 may be programmed specifically for the intended use at the site and, if need be, may conduct an operation in the on-line operation. Moreover, it would also be feasable to use the computer for recording documentations.

After the control block 19 had been programmed in the desired manner, the computer 35 can be removed and the free interface 33 can be used for connecting an indication and/or operating device 36. The corresponding connecting cable is indicated at 34'. The operator may now very comfortably feed the orders for the control block 19 which are required during operation.

It is to be understood that, if need be,an intrinsic interface is provided on control block 19 for the indication and/or operating device.

The control device 1 in accordance with FIG. 1, is a so-called stand alone solution which is suitable for closed cycle operations and operates by itsself. The connection of further valve stations 2 is not provided. Only a connecting device 37 is provided which enables the supply of power, in particular for the circuit voltage of the drives and the supply voltage for the monitoring devices 25.

The valve drives 16 are in particular devices with electromagnets, which are also called solenoids. By way of example,the valve drives are designed as electrically actuable magnet valves. Thereby, valves 12 practically represent the main valves which may be controlled by the magnet valves as precontrol valves and which advantageously are multiway valves, for example, 5/2-way valves or 5/3-way valves.

A control device 1' is illustrated in FIG. 2 and is expanded with respect to the exemplified embodiment of FIG. 1. It is composed of a plurality of valve stations 2' which, irrespective of a modification of control block 19',corresponds to the embodiment of the valve station 2 in accordance with FIG. 1. The modified control block 19' enables to connect the valve station 2' to a field bus 38, so as to couple the mentioned plurality of valve stations 2' effectively with each other. Each control block 19' is provided with one or a plurality of fieldbus-connecting means 39, so that a sequential switching is possible, for example. Advantageously, the field bus 38 is formed by a two-wire-line which extends from valve station to valve station. Thereby, the device is such that the control block of a valve station 2' forms a so-called master-control unit 40, from which all further valve stations 2' connected through the field bus 38 are dependend therefrom. The latter are therefore so-called slaves, which are designed as intelligent slaves which each have their own control block 19'. Thus, a programable valve station 41 is created as the master containing the master-control unit 40 which controls and monitors the further coupled valve stations 2'. These dependent valve stations 2' have their own control block 19', so that they can operated independent from the other slaves. Each control block 19' can be programmed independent from the other control blocks.

A further variant is the control device 1" in accordance with FIG. 3. Again a valve station 2' of the type illustrated in FIG. 2 is provided, whose control block 19' is designed as master-control block 40, so that the valve station 2' itself forms a main or master-valve station 41. A field bus 38 is connected to the field bus connecting means 39 of the master-control unit 40, through which a plurality of further valve stations are connected, which are control blockless valve stations 2". Instead of a control block each of these valve stations 2" is provided with a field bus-communication unit 42 with which it is connected on the mentioned field bus 38 and through the same on the master-control unit 40 of the master-valve station 41. Thus, the valve stations 2" are merely order receivers which do not contain their own intelligence or control device, so that programming connections are not required and that merely field bus connections 39 are provided. In this case the master-valve station 41 controls and monitors as the main valve station the connected dependent valve stations, as is the case in the exemplified embodiment in accordance with FIG. 2. This is a very economical solution, in particular for such automation tasks wherein operating devices 15 and monitoring devices 25 are associated in a common machine station or processing unit.

In all cases there is a modular structure of a device consisting of valve stations. With respect to the so-called slaves, these may be other operating stations in addition to the valve stations, for example, devices with decentral inlets and outlets through which electrically actuable operating devices 15 can be actuated, for example, relays. It is to be understood that one can simultaneously provide valve stations with (2') or without (2") control block for slaves which are dependent from a master-valve station 41.

The number of valve stations being dependent from a master-valve station 41 can vary depending on the demand, whereby a number of one to four pieces has been shown to be optimal.

Notwithstanding of their differences with respect to the control block and the field bus-communication unit, the valve stations 2', 2" of FIGS. 2 and 3 may correspond in their structure to the valve station 2 of FIG. 1.

It is to be understood that the actuating signals of the control blocks can also be transmitted optically.

What is claimed is:

1. An electro-pneumatic control device comprising:

a first valve station designed as a subassembly, said first valve station being provided with a first fluid distributor which is equipped with a plurality of first valve station valves;

a plurality of electrically actuable first valve station valve drives for said first valve station valves; and a first central electronic control unit designed as a first control block, said first control block supplying first valve station electric actuating signals for the first valve station valve drives, said first control block being a direct component of said first valve station, said first control block containing a control program, said control program containing parameters to be considered for actuating at least said first valve station valve drives.

2. A control device in accordance with claim 1, wherein said first control block is designed as a detachable subassembly part of said first valve station.

3. A control device in accordance with claim 1 or 2, wherein:

said first control block is programmable; and said control program is a variable programmable control program.

4. A control device in accordance with claim 1, wherein said first valve station is provided with at least one interface on said first control block for connection to a computer.

5. A control device in accordance with claim 4, wherein said interface enables the connection of at least one of an indication and an operating device.

6. A control device in accordance with claim 1 further comprising a field bus, said field bus being connectable to said first control block of said first valve station for coupling of said first valve station to at least one further operating station.

7. A control device in accordance with claim 6, wherein said first control block forms a master-control unit from which the further operating station is controlled through said field bus.

8. A control device in accordance with claim 7, wherein said further operating station is a second valve station having a second control block connected with said master-control unit by said field bus.

9. A control device in accordance with claim 7, wherein said further operating station is a control blockless slave station provided with a field bus communication unit connected through said field bus to said first control block.

10. A control device in accordance with claim 9, further comprising:

a plurality of slave station valve drives on said slave station; and means provided on said slave station for transmitting of slave station electric actuating signals between said field bus communication unit and said slave station valve drives.

11. A control device in accordance with claim 1, further comprising a connecting means for connection of monitoring devices which communicate with said first control block.

12. A control device in accordance with claim 1, further comprising a base plate for said first valve station, wherein said first control block is mounted on said base plate and said base plate is fixedly connected with said first fluid distributor.

13. A control device in accordance with claim 12, wherein said plurality of first valve station valves are mounted on a face of said base plate.

14. A control device in accordance with claim 1, wherein said first fluid distributor is formed as a base plate for said first valve station and said first control block is mounted on said base plate.

15. A control device in accordance with claim 14, wherein said plurality of first valve station valves are mounted on a face of said base plate.

* * * * *